United States Patent
Song et al.

(10) Patent No.: US 11,091,049 B2
(45) Date of Patent: Aug. 17, 2021

(54) POWER CONVERSION DEVICE FOR CHARGING VEHICLE BATTERY AND METHOD FOR CONTROLLING THE SAME

(71) Applicants: Hyundai Motor Company, Seoul (KR); Kia Motors Corporation, Seoul (KR)

(72) Inventors: Byeong-Seob Song, Gyeonggi-do (KR); Sam-Gyun Kim, Gyeonggi-do (KR); Jae-Hyuk Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 175 days.

(21) Appl. No.: 16/202,541

(22) Filed: Nov. 28, 2018

(65) Prior Publication Data
US 2019/0359073 A1    Nov. 28, 2019

(30) Foreign Application Priority Data
May 23, 2018  (KR) .......................... 10-2018-0058275

(51) Int. Cl.
| H02J 7/00 | (2006.01) |
| B60L 53/30 | (2019.01) |
| H02M 1/14 | (2006.01) |
| H02J 7/02 | (2016.01) |
| B60L 53/14 | (2019.01) |
| H02P 27/08 | (2006.01) |
| H02M 7/5387 | (2007.01) |
| B60K 6/20 | (2007.10) |
| H02J 7/34 | (2006.01) |

(52) U.S. Cl.
CPC ............... B60L 53/30 (2019.02); B60L 53/14 (2019.02); H02J 7/0045 (2013.01); H02J 7/0047 (2013.01); H02J 7/0068 (2013.01); H02J 7/02 (2013.01); H02M 1/14 (2013.01); B60K 6/20 (2013.01); B60Y 2200/91 (2013.01); B60Y 2200/92 (2013.01); B60Y 2300/91 (2013.01); H02J 7/342 (2020.01); H02M 7/53871 (2013.01); H02P 27/08 (2013.01)

(58) Field of Classification Search
USPC ................................ 320/107, 108, 109, 110
See application file for complete search history.

(56) References Cited

U.S. PATENT DOCUMENTS

| 2010/0270860 | A1* | 10/2010 | Kamaga ................. B60R 16/03 307/10.7 |
| 2014/0236379 | A1* | 8/2014 | Masuda ................. B60L 53/20 700/297 |

(Continued)

FOREIGN PATENT DOCUMENTS

| KR | 20120131733 A | 12/2012 |
| KR | 20160070200 A | 6/2016 |

*Primary Examiner* — Brian Ngo
(74) *Attorney, Agent, or Firm* — Mintz Levin Cohn Ferris Glovsky and Popeo, P.C.; Peter F. Corless

(57) ABSTRACT

A power conversion device for charging a battery of a vehicle may include the battery, a motor for receiving a battery power source from the battery, a power controller for controlling the motor to change the battery power source into charging power, and a charging controller for selectively performing a charging power supply control for supplying the charging power to the outside and a charging power receipt control for receiving external power.

18 Claims, 11 Drawing Sheets

(56) References Cited

U.S. PATENT DOCUMENTS

| | | | |
|---|---|---|---|
| 2018/0062420 A1* | 3/2018 | Isaac | H04B 5/0031 |
| 2018/0345816 A1* | 12/2018 | Sakakibara | B60L 11/1875 |
| 2018/0358837 A1* | 12/2018 | Sakakibara | B60L 53/62 |
| 2019/0113581 A1* | 4/2019 | Kawamura | G01R 31/382 |
| 2019/0232813 A1* | 8/2019 | Kusumi | B60L 53/14 |
| 2019/0322185 A1* | 10/2019 | Kinomura | H02J 7/007 |

* cited by examiner

POWER CONVERSION DEVICE FOR CHARGING VEHICLE BATTERY AND METHOD FOR CONTROLLING THE SAME

CROSS-REFERENCE TO RELATED APPLICATION

This application claims under 35 U.S.C. § 119(a) the benefit of Korean Patent Application No. 10-2018-0058275 filed on May 23, 2018, the entire contents of which are incorporated herein by reference.

BACKGROUND

(a) Technical Field

The present disclosure relates to a vehicle battery, more particularly, to a power conversion device for charging the vehicle battery via mobile charging and a method for controlling the same.

(b) Description of Related Art

The primary energy source of an eco-friendly vehicle, as distinguished from a gasoline/diesel vehicle, is electricity, and the eco-friendly vehicle typically requires a high voltage battery that can store electric energy, an electric motor as a power source, and an inverter for driving the electric motor.

Recently, in order to increase mileage and/or electrical efficiency of the eco-friendly vehicle, it has been emphasized to increase the capacity of the battery, and also increase the efficiency of the inverter and the electric motor.

In addition, as eco-friendly vehicles become more widespread, such vehicles may compete for use of a limited number of charging stations, or may be subject to "range anxiety" due to the risk of discharging during driving or the discharging when left unused for a long period, and thus cannot rely on a general grid power source, etc. Accordingly, a vehicle equipped with a mobile charger that can provide a charge in an emergency has been developed.

The vehicle with the mobile charger is usually composed of a large capacity battery, a power converter (i.e., a charging-and-discharging device) in a small truck. Alternatively, as a system that is configured by connecting the charging-and-discharging device to an Electric Vehicle (EV) using an EV battery, it operates like a normal quick charger.

However, the large capacity battery and the power converter (i.e., the charging-and-discharging device) are disadvantageous in that they are large in size and expensive and should be produced as a special vehicle.

The contents described in Description of Related Art are to help the understanding of the background of the present disclosure, and can include what is not previously known to those skilled in the art to which the present disclosure pertains.

SUMMARY

The present disclosure provides a power conversion device for charging a vehicle battery and a method for controlling the same, which can enable a Direct Current (DC) charging service using a battery, an inverter, and a motor in an internal system without requiring an additional power generator or battery and a charging-and-discharging device.

In addition, another object of the present disclosure is to provide a power conversion device for charging a vehicle battery and a method for controlling the same, which can increase the size/cost/efficiency of a service vehicle by minimizing separate additional parts.

In addition, still another object of the present disclosure is to provide a power conversion device for charging a vehicle battery and a method for controlling the same, which can share battery energy between general Electric Vehicles (EVs).

The present disclosure provides a power conversion device for charging a vehicle battery, which can enable a Direct Current (DC) charging service using a battery, an inverter, and a motor in an internal system without an additional power generator or battery and a charging-and-discharging device.

A power conversion device for charging a battery of a vehicle includes the battery; a motor for receiving a battery power source from the battery; a power controller for controlling the motor to change the battery power source into charging power; and a charging controller for selectively performing a charging power supply control for supplying the charging power to the outside and a charging power receipt control for receiving external power.

In particular, the motor can have a neutral point lead unit configured such that a neutral point is led into the outside to be operable as a coupled inductor.

In addition, the neutral point lead unit can include a sensor for detecting the external power.

In addition, the neutral point lead unit can include a filter for filtering a ripple of the charging power.

In addition, the power conversion device for charging the vehicle battery can include a connection inlet connector connected with the outside to deliver the charging power or the control signal.

In addition, the connection inlet connector can have a first terminal for receiving the external power, a second terminal for detecting whether or not the connection inlet connector is connected with the outside, and a signal connection terminal for transmitting/receiving a control signal.

In addition, the power conversion device for charging the vehicle battery can further include a display for displaying information on the charging power or the external power.

In particular, the charging power can be set by a user input.

In addition, the charging power can be a voltage lower than the battery power source, and can be adjusted by a Pulse Width Modulation (PWM) duty.

In addition, the charging controller can include a charging control unit for executing the charging power supply control, and a discharging control unit for executing the charging power receipt control.

On the other hand, another embodiment of the present disclosure can provide a method for converting power for charging a vehicle battery including a charging controller selectively performing a charging power supply control for supplying charging power to the outside and a charging power receipt control for receiving external power; a motor receiving a battery power source from a battery; and a power controller controlling the motor to change the battery power source into the charging power depending upon a control of the charging controller.

In addition, the selecting can further include displaying information on the charging power or the external power, and the charging power can be set by a user input.

According to the present disclosure, there is no need for a power generator or a battery and a converter that are mounted in a mobile charging service vehicle, and urgent emergency charging can be performed using the vehicle in the emergency situation in which a high voltage battery has been discharged.

In addition, as another effect of the present disclosure, it is not necessary to produce a separate mobile charging service vehicle, and it is possible to constitute the charging system as the existing driving motor and inverter, thus reducing size/material cost/weight thereof.

In addition, as still another effect of the present disclosure, it is possible to easily charge by being connected to a quick charging port, anywhere, at any time, like a jump start upon discharging of 12 V in a general vehicle.

In addition, as yet another effect of the present disclosure, it is possible to minimize an output ripple current when operating in a three-phase interleave switching scheme.

In addition, as still yet another effect of the present disclosure, it is possible to change an operation mode so that the motor and the inverter operate as a step-down converter to charge the battery when the discharging vehicle is connected thereto not only when the motor is driven during driving, but also upon the quick charging (supply) unlike the conventional case.

In addition, as further effect of the present disclosure, it is possible to enable the vehicle-to-vehicle quick charging without an additional circuit while increasing the utilization of the motor and the inverter as the step-down converter.

BRIEF DESCRIPTION OF THE DRAWINGS

FIG. 4b is a detailed block diagram of the connection inlet connector illustrated in FIG. 4a.

DESCRIPTION OF SPECIFIC EMBODIMENTS

Figure 1:
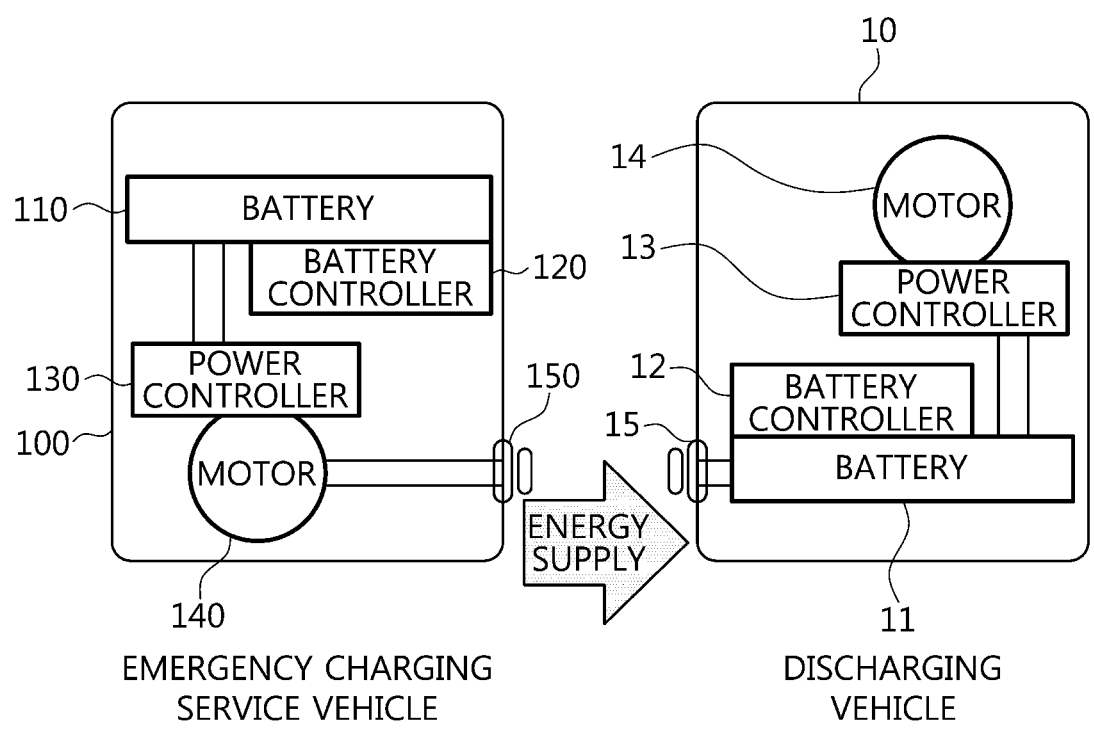
FIG. 1 is a charging conceptual diagram in accordance with an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Various modifications and various embodiments can be made in the present disclosure, so that specific embodiments are illustrated in the drawings and described in detail in the specification. It should be understood, however, that it is not intended to limit the present disclosure to the particular disclosed forms, but includes all modifications, equivalents, and alternatives falling within the spirit and technical scope of the present disclosure.

Unless otherwise defined, all terms including technical and scientific terms used herein have the same meaning as commonly understood by one of ordinary skill in the art to which the present disclosure belongs.

It will be further understood that terms, such as those defined in commonly used dictionaries, should be additionally interpreted as having a meaning that is consistent with their meaning in the context of the relevant art, and will not be interpreted in an idealized or overly formal sense unless expressly so defined in the application.

Hereinafter, a power conversion device for charging a vehicle battery and a method for controlling the same in accordance with an embodiment of the present disclosure will be described in detail with reference to the accompanying drawings.

FIG. 1 is a charging conceptual diagram in accordance with an embodiment of the present disclosure. Referring to FIG. 1, an emergency charging service vehicle 100 supplies energy to a discharging vehicle 10. For this purpose, the emergency charging service vehicle 100 can be configured to include a battery 110, a battery controller 120 for controlling the battery 110, a motor 140 for receiving a battery power source from the battery 110, a power controller 130 for controlling the motor to change the battery power source into charging power, etc. Meanwhile, the discharging vehicle 10 can be also configured to include a battery 11, a battery controller 12 for controlling the battery 11, a motor 14 for receiving a battery power source from the battery 11, a power controller 13 for controlling the motor 14 to change the battery power source into charging power.

The batteries 11, 110 have battery cells (not shown) configured in series and/or in parallel, where each of the battery cells can be a high voltage battery cell for an electric vehicle such as a nickel metal battery cell, a lithium ion battery cell, a lithium polymer battery cell, and an all-solid-state battery. Generally, a high voltage battery is a battery used as a power source for moving an electric vehicle and refers to a high voltage of 100 V or more. However, it is not limited thereto, and a low voltage battery is also possible.

The battery cell can be designed as a cylindrical cell, a prismatic cell, a pouch-shaped cell, etc. The pouch-shaped cells include a flexible cover composed of a thin film, and the electrical components of the battery cell are located in the cover.

In order to use an optimal space in one battery cell, the pouch-shaped cells can be particularly used. The pouch-shaped cells also have the properties of high capacity and low weight. The edges of the above-described pouch-shaped cells include a sealing joint (not shown). That is, the joint connects two thin films of the battery cells, and the thin films include additional parts within the cavity formed thereby.

Generally, the pouch-shaped cells can also include an electrolytic solution, such as a lithium secondary battery or a nickel-hydrogen battery.

The battery controllers 12, 120 optimize the management of the batteries 11, 110, respectively, as a Battery Management System (BMS), thus enhancing energy efficiency and extending the life span. The battery controllers 12, 120 monitor battery voltage, current, and/or temperature in real time and prevent excessive charging and discharging in advance, thus enhancing safety and reliability of the battery. The battery controllers 12, 120 can be also configured in the batteries 11, 110, respectively.

The power controllers 13, 130 receive a battery power source (i.e., a battery voltage) from the batteries 11, 110, respectively, to convert them into a drive power source (e.g., a three-phase AC power source) for driving the motors 14, 140, respectively. The power controllers 13, 130 can also step-up or step-down the battery power source for supplying to an electric field load (not shown) to provide it thereto. Accordingly, the power controllers 13, 130 can be composed of an inverter, a Direct Current-Direct Current (DC-DC) converter, etc.

The inverter preferably uses a Pulse Width Modulation (PWM) inverter, which is a voltage type inverter, but it is not limited thereto, and it is possible to apply a current type inverter by modifying some components. The PWM inverter simultaneously controls the voltage and frequency thereof using a Pulse Width Modulation (PWM) control method for a rectified DC voltage.

The motors 14, 140 can use three-phase alternating-current motors or multi-phase motors. Particularly, the motors 14, 140 can be interior permanent magnet motors, but are not limited thereto and can be universal motors, etc.

Connection inlet connectors 15, 150 are connected to the outside to deliver the charging power and/or a control signal. In FIG. 1, energy is supplied from the connection inlet connector 150 configured at the emergency charging service vehicle 100 side through the connection inlet connector 15 configured at the discharging vehicle 10 side.

The discharging vehicle 10 and/or the emergency charging service vehicle 100 can be a Plug-in Electric Vehicle (PEV), an Electric Vehicle (EV), a Fuel Cell Vehicle (FCV), etc. The discharging vehicle 10 can also become the emergency charging service vehicle 100. That is, when the emergency charging service vehicle 100 is discharged, it can be charged using another emergency charging service vehicle.

Figure 2:
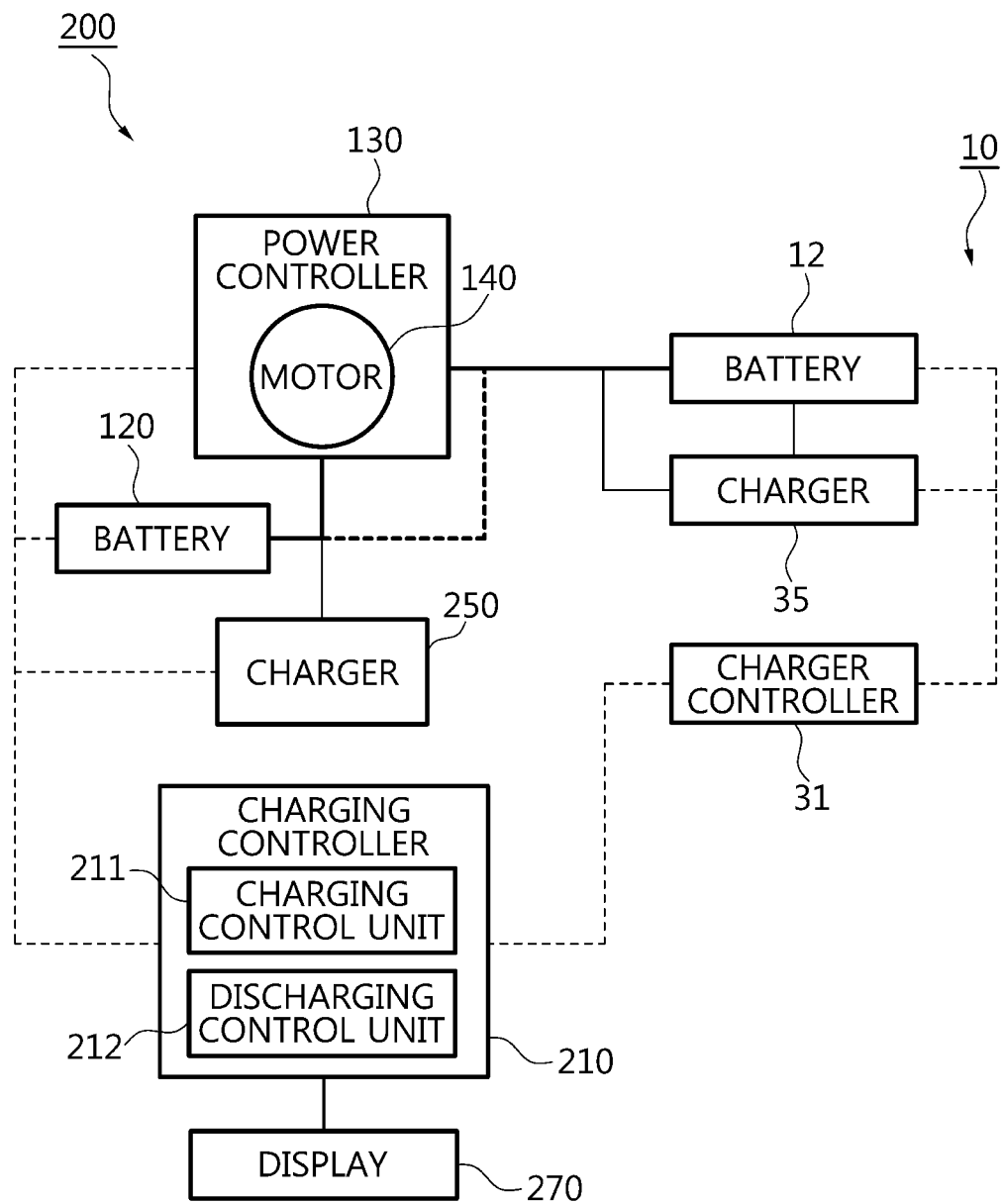
FIG. 2 is a block diagram of the configuration of a power conversion device for charging a vehicle battery in accordance with an embodiment of the present disclosure.

FIG. 2 is a block diagram of the configuration of a power conversion device 200 for charging a vehicle battery in accordance with an embodiment of the present disclosure. Particularly, FIG. 2 is a conceptual diagram that is compatible with chargers of different voltages. That is, referring to FIG. 2, there is illustrated the relationship of supplying charging power between the emergency charging service vehicle 100 having the power conversion device for charging the vehicle battery 200 and the general vehicle 10.

Referring to FIG. 2, the power conversion device for charging the vehicle battery 200 can be configured to include a battery 120, a motor 140 for receiving a battery power source from the battery 120, a power controller 130 for controlling the motor to change the battery power source into charging power, a charging controller 210 for performing a charging power supply control for supplying the charging power to the outside or a charging power receipt control for receiving external power, a charger 250 for charging the battery 120, etc.

The discharging vehicle 10 is also composed of a charger 35 for charging the battery 12 and a charger controller 31 for controlling the charger 35. The charging controller 31 can be composed of a control circuit for communicating a charging station and other components in the vehicle and controlling the charger 35.

The chargers 35, 250 are an On board charger and an Off board charger, respectively. The chargers 35, 250 convert the Alternating Current (AC) into the Direct Current (DC) to charge the batteries 12, 120, respectively, in the vehicle. For this purpose, the chargers 35, 250 can be configured to include an input filter for removing the noise of the AC power source that is an input power source, a Power Factor Corrector (PFC) circuit for enhancing energy efficiency, a DC/DC converter for stably supplying power to the battery, etc.

The charging controller 210 can be configured to include a charging control unit 211 for receiving external power to execute the charging power receipt control, a discharging control unit 212 for executing the charging power supply control for supplying charging power to the outside, etc. That is, the charging controller 210 operates to switch between the charging control unit 211 and the discharging control unit 212 to supply or receive power. The charging control unit 211 and the discharging control unit 212 are composed of a microprocessor, a memory, an electronic circuit, etc., and the microprocessor is programmed to execute the control. The electronic circuit can be an Integrated Circuit (IC), a switching element, etc.

As illustrated in FIG. 2, the charging control unit 211 of the charging controller 210 is operated upon activation of a power supply. That is, the charging controller 210 can operate as the charging power supply control, operate the power controller 130 and the motor 140 as a step-down converter to supply power to an opponent vehicle (bold solid line), and transmit/receive information of each other (thin dotted line).

Unlike FIG. 2, upon charging between the vehicles to which the power conversion device for charging the vehicle battery 200 is applied, a supply side vehicle that supplies charging power executes the charging power supply control for supplying the charging power to the outside, and a receipt side vehicle that receives the charging power executes the charging power receipt control that receives external power. When the charging power receipt control that receives the external power is executed, the battery can be charged by bypassing the motor 140/the power controller 130 or can be also charged through the motor 140/the power controller 130, as indicated by a thick dotted line.

In addition, a display 270 for displaying information on the charging power, the external power, vehicle information, battery information, etc. is configured to be connected to the charging controller 210 or an in-vehicle controller. The in-vehicle controller includes a Vehicle Control Unit (VCU), a Hybrid Control Unit (HCU), etc. The display 270 can be a Liquid Crystal Display (LCD), a Light Emitting Diode (LED) display, a Plasma Display Panel (PDP), an Organic LED (OLED) display, a touch screen, a Cathode Ray Tube (CRT), a flexible display, etc.

Figure 3:
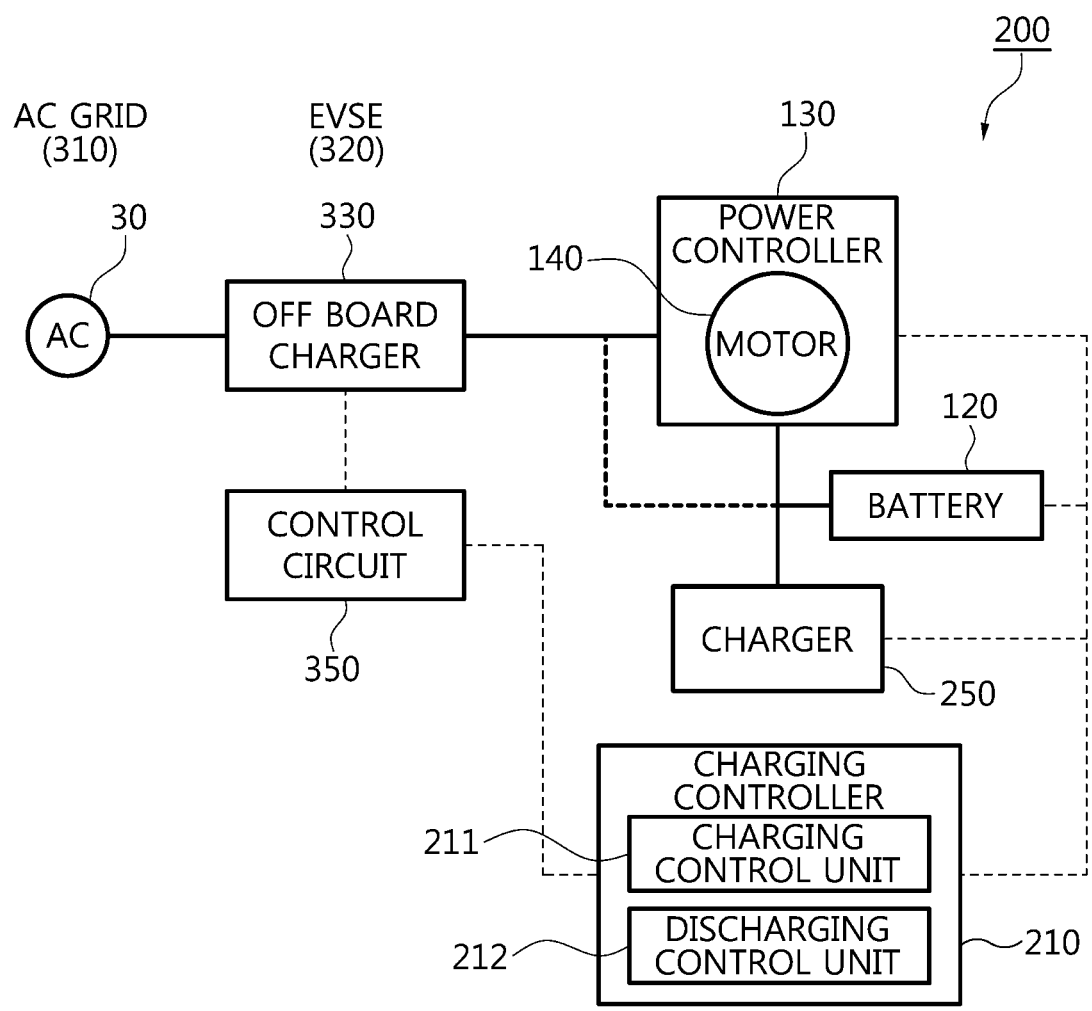
FIG. 3 is a conceptual diagram that the power conversion device for charging the vehicle battery illustrated in FIG. 2 is connected with a grid.

FIG. 3 is a conceptual diagram that the power conversion device for charging the vehicle battery illustrated in FIG. 2 is connected to a grid. Referring to FIG. 3, an Electric Vehicle Supply Equipment (EVSE) 320 receives a grid power source 30 from an AC grid 310 to supply charging power to the power conversion device for charging the vehicle battery 200. That is, the charging controller 210 executes the charging power receipt control for receiving external power. The vehicle side that receives power can charge the battery 120 by bypassing the motor 140/the power controller 130 or also charge the battery 120 through the motor 140/the power controller 130, as indicated by the thick dotted line.

When the vehicle executes the charging power supply control for supplying the charging power to the outside, the charging controller 210 can operate the power controller 130 and the motor 140 as a step-down converter to supply power to an Off board charger 330 (a thick solid line), and transmit/receive information of each other with a control circuit 350 for controlling the Off board charger 330 (a thin dotted line).

Herein, the Off board charger 330 can be a bi-directional charger. For this purpose, the Off board charger 330 can be composed of a rectifier, a DC power supply, etc.

Figure 4A:
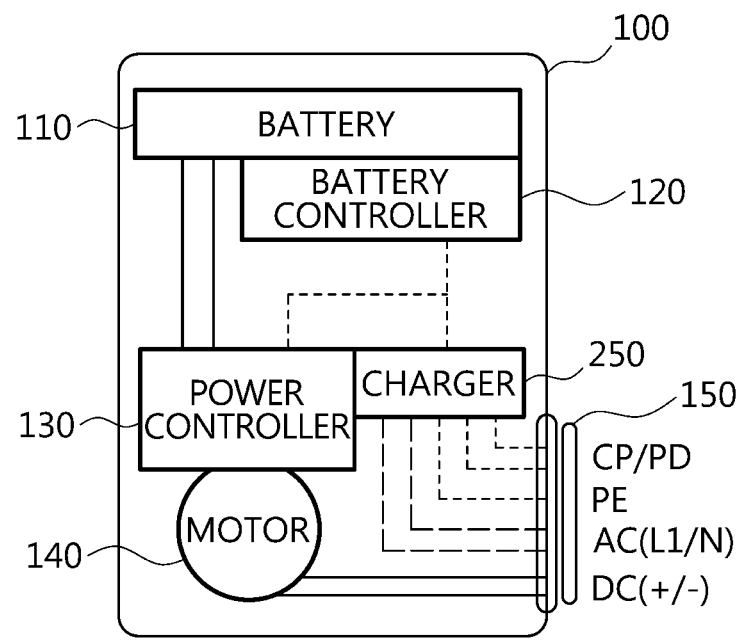
FIG. 4a is a conceptual diagram of a connection inlet connector in FIG. 1.
Figure 4B:
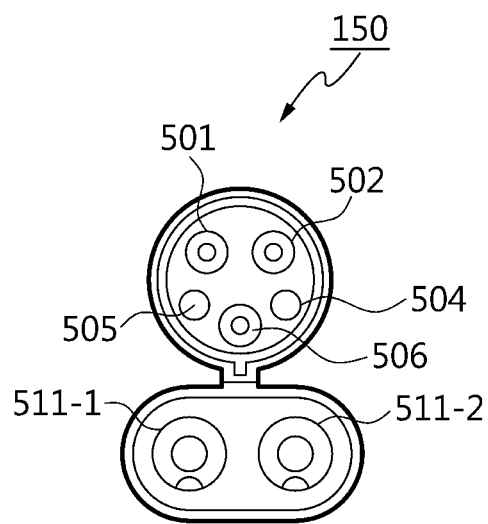

FIG. 4a is a conceptual diagram of the connection inlet connector 150 in FIG. 1, and FIG. 4b is a detailed block diagram of the connection inlet connector illustrated in FIG. 4a. Referring to FIGS. 4a and 4b, the connection inlet connector 150 is connected with the outside to deliver charging power and/or a control signal. For this purpose, the connection inlet connector 150 can be configured to include power supply terminals 501, 502 for supplying a power source (e.g., an AC three-phase power source), a signal connection terminal 504 for transmitting/receiving a control signal (Control Pilot (CP)) and/or a proximity detection signal (Proximity Detection (PD)), a connection switch terminal 505 for detecting whether or not the connection inlet connector 150 has been connected to the outside (another vehicle, an EVSE, etc.), an earth (Protective Earth (PE)) terminal 506 for the ground of the power source, Direct Current (DC) terminals 511-1, 511-2 for supplying power of the vehicle to the outside, etc.

Accordingly, the charging controller 210 can control the power through the signal acquired through the signal connection terminal 504. That is, the charging controller 210 can disconnect the power supply at any time when detecting abnormality from the outside or receiving a certain signal before or while connected with the outside to supply the power.

In addition, the connection switch terminal 505 serves as a terminal for disconnecting to prevent the battery high voltage from being delivered before the user completely removes the connection inlet connector 150 from the vehicle. A plug (not shown) connected with the connection inlet connector 150 also has similarly connector pins that can be connected with the terminals. In addition, the battery controller 120, the charger 250, the power controller 130, the charging controller 210, etc. can be connected by a Multimedia-Controller Area Network (MM-CAN), a Body-Controller Area Network (B-CAN), a high speed Controller Area Network (CAN), a communication line (e.g., 500 kbps), a CAN-Flexible Data-Rate (CAN-FD) communication line, a Flexlay communication line, a Local Interconnect Network (LIN) communication line, a Power Line Communication (PLC) communication line, a Control Pilot (CP) communication line, etc. to transmit/receive information between them.

Figure 5:
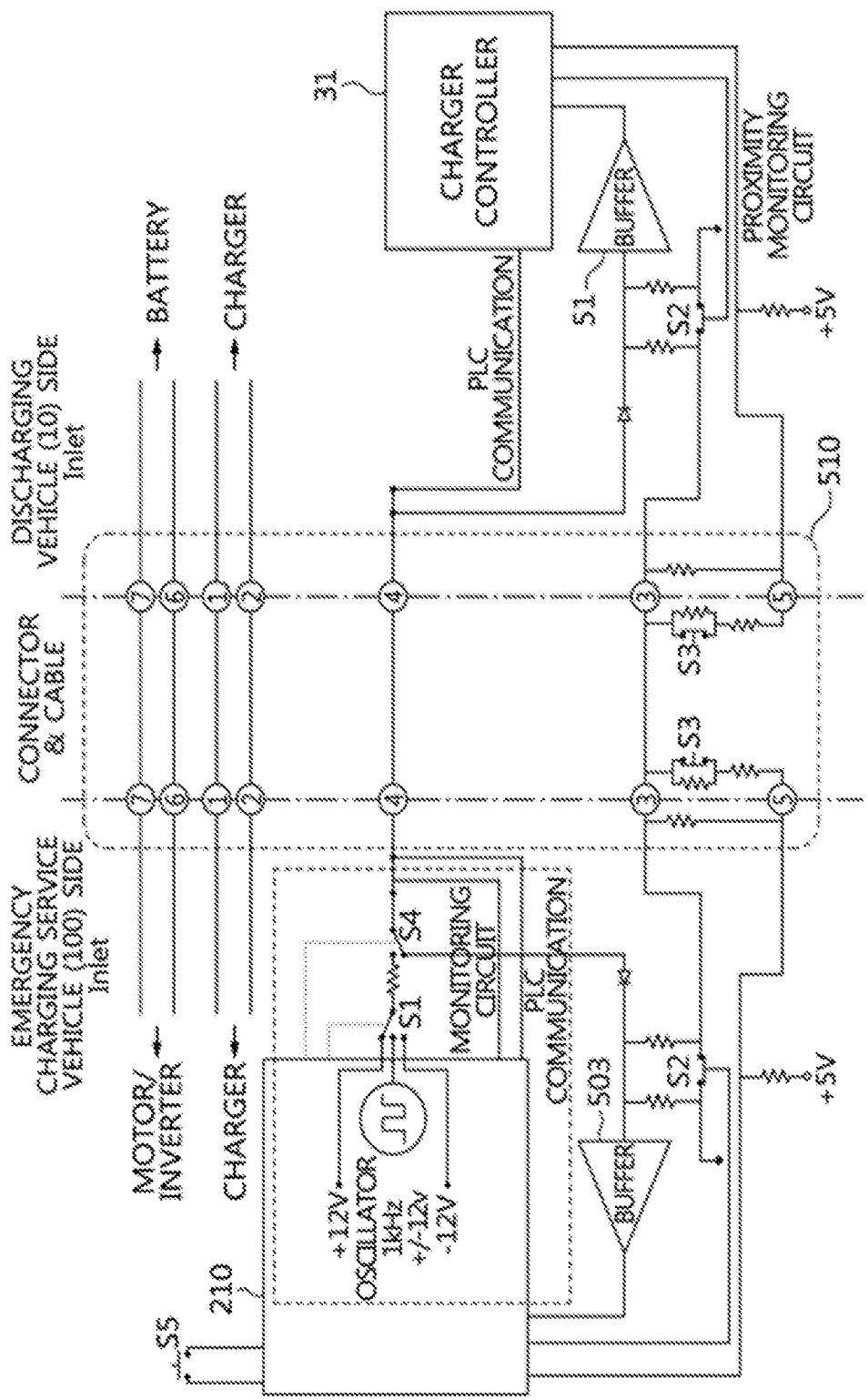
FIG. 5 is a diagram illustrating the connection with a general vehicle in accordance with an embodiment of the present disclosure.

FIG. 5 is a diagram illustrating the connection with a general vehicle in accordance with an embodiment of the present disclosure. Referring to FIG. 5, the emergency charging service vehicle 100 and the discharging vehicle 10 are connected to a cable 510. That is, the inlet sides of the emergency charging service vehicle 100 and the discharging vehicle 10 are connected to each other. In this connection state, the charging controller 210 can recognize that it is in a vehicle-to-vehicle quick charging mode through the operation of a switch S5, and switches the location of a switch S4 into an EVSE mode in order to operate in a quick charging supply mode to perform the initial function of the EVSE. Herein, the EVSE mode refers to performing quick charging by simulating the general EVSE (320 in FIG. 3).

In addition, after it is determined that the cable 510 has been normally connected, the information of each other can be exchanged through PLC communication and the charging function can be performed.

Meanwhile, upon the vehicle-to-vehicle charging, as illustrated in FIG. 5, the cable 510 is provided with a connector internal circuit (S3, resistor, etc.) with the same structure at the supply vehicle side and the receipt vehicle side. Accordingly, in the emergency charging service vehicle 100, the connector circuit can be configured to be compatible therewith when the EVSE is connected to receive energy and when the discharging vehicle is connected to supply energy.

In addition, when the general EVSE is connected thereto, the switch S4 can connect the switch to down in order to operate like the normal vehicle, thus receiving the signal transmitted by the EVSE 320. Accordingly, after confirming that the connector has been connected, the information can be exchanged with EVSE through the PLC communication, and power can be supplied thereto. For this purpose, a diode, a buffer 503, a switch S2, a resistor, etc. are connected in series and/or in parallel. In addition, the switch S2 is connected with the ground. This configuration is similarly configured at the discharging vehicle 10 side.

A monitoring circuit and a PLC communication circuit connected behind the switch S4 in the circuit of the emergency charging service vehicle 100 can be either in front of or behind the switch S4. Meanwhile, a circuit can be also implemented that can switch between the charging control unit (211 in FIG. 2) for executing the charging power supply control for supplying the charging power to the outside by the switch S1 instead of the switch S4 or another switch circuit and the discharging control unit 212 for executing the charging power receipt control for receiving the external power.

In addition, the charging controller 210 determines whether or not the discharging vehicle 10 has been in proximity to the emergency charging service vehicle 100 before contacting thereto through a proximity monitoring circuit. For this purpose, a proximity sensor can be configured therein.

Separate circuits for temperature sensing, insulation monitoring, etc. for performing other functions of the EVSE and/or the vehicle side are omitted.

In addition, the switches S1 to S5 can use a semiconductor switching element such as a power relay, a Field Effect Transistor (FET), a Metal Oxide Semiconductor FET (MOS-FET), an Insulated Gate Bipolar Mode Transistor (IGBT), and a power rectifier diode, a thyristor, a Gate Turn-Off (GTO) thyristor, a TRIode for Alternating Current (TRIAC), a Silicon Controlled Rectifier (SCR), and an Integrated Circuit (IC) circuit, etc. Particularly, in the semiconductor element, a bipolar or a power Metal Oxide Silicon Field Effect Transistor (MOSFET) element, etc. can be used. The power MOSFET element performs a high-voltage, high-current operation, such that it has a Double-Diffused Metal Oxide Semiconductor (DMOS) structure unlike the conventional MOSFET.

Figure 6:
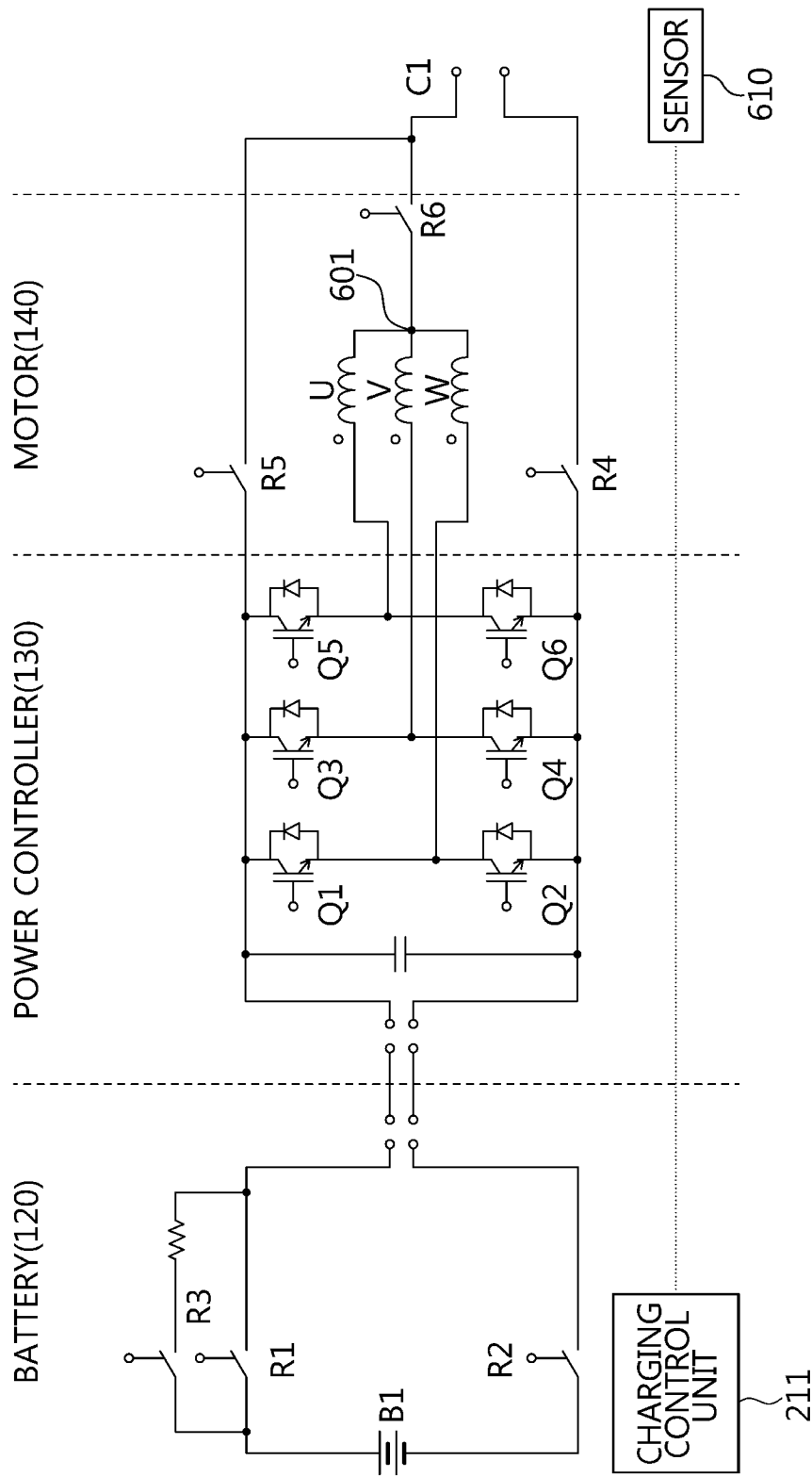
FIG. 6 is a block diagram of the configuration of a power circuit in accordance with an embodiment of the present disclosure.

FIG. 6 is a block diagram of the configuration of a power circuit in accordance with an embodiment of the present disclosure. Particularly, FIG. 6 illustrates an example that the motor (140 in FIG. 2) and the power controller 130 operate as a step-down converter to implement the function of the EVSE mode. Referring to FIG. 6, the power circuit can be largely divided into a battery, a power controller (an inverter), and a motor. The power controller 130 can operate by controlling a current having a phase difference of 120 degrees in three-phase upon motor driving, but operate as a step-down converter during the vehicle stop to charge an external other vehicle.

The power controller 130 includes a control unit (not shown) and six switches Q1 to Q6 are configured in parallel, and when Q1, Q3, Q5 are switched, the power controller 130 operates as a step-down converter of a three-phase converter. The control unit is composed of a microprocessor, an electronic circuit, etc. In particular, the DC current including the ripple is inputted thereto through the three-phase winding of the motor 140, and a neutral point lead unit C1 is configured such that a neutral point 601 is led at the output side of the motor 140. A current which is seen as the sum of the three-phase currents is output through the neutral point lead unit C1. The output current is output at a voltage lower than the voltage of a battery B1, and can be adjusted by a Pulse Width Modulation (PWM) duty.

In addition, an L or L/C filter, etc. can be provided to minimize the DC current ripple with respect to the output current of the neutral point lead unit C1. In addition, a switch R6 is configured between the motor 140 and the neutral point lead unit C1 so that the motor 140 operates as a motor or a converter. In addition, the neutral point lead unit C1 can include a sensor 610 that can detect the external power flowed therein. The sensor 610 can be connected with the control unit of the power controller 130.

The battery 120 side is provided with the switches R1, R2, R3 for conducting or disconnecting a battery power source. Particularly, the switch R3 is provided to prevent the battery 120 from being damaged due to overvoltage, etc. when the external power is flowed in from the neutral point lead unit C1, and the resistor can be connected in series.

The motor 140 generally has a stator winding (not shown) and a rotor (not shown), and the stator winding is composed of a leakage inductance, a mutual inductance, etc. When a phase current flows, it is changed through the current control of the stator winding to rotate the stator magnetic flux that becomes a sum of the magnetic flux vectors to rotate the rotor.

In contrast, in an embodiment of the present disclosure, the motor 140 constitutes the neutral point lead unit C1 in the motor 140 to operate as a DC-DC converter. That is, when the three-phase currents are controlled with the same current magnitude, the magnetic flux vector of each phase U, V, W is equal in magnitude and the magnetic flux vector having a different direction by 120 degrees are made, and the sum of the magnetic flux vectors is zero when the magnitudes of three-phase currents are equal. In this case, no rotational torque is generated regardless of the location of the rotor and the magnitude of the current, and when operating like a three-phase interleave DC-DC converter, it can be operated as a step-up or step-down converter without the rotational torque of the motor.

Figure 7:
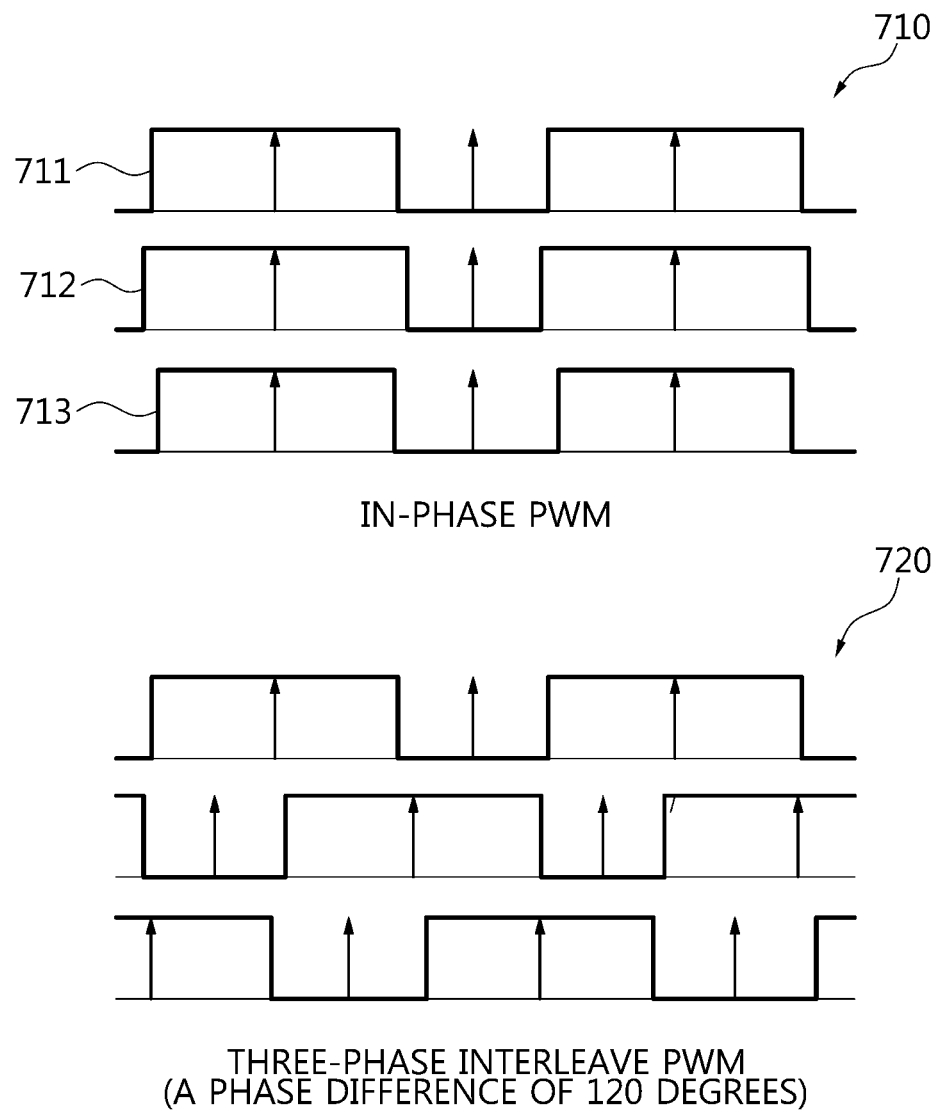
FIG. 7 is a comparison waveform diagram between an in-phase Pulse Width Modulation (PWM) and a three-phase interleave PWM in accordance with an embodiment of the present disclosure.

FIG. 7 is a comparison waveform diagram of the in-phase Pulse Width Modulations (PWMs) 711, 712, 713 and the three-phase interleave PWM in accordance with an embodiment of the present disclosure. Referring to FIG. 7, when the motor 140 is a three-phase motor, it has a three-phase inductance component, and the converter operation can be performed by the inductance. When the power controller 130 operates with the in-phase PWM 710, only the leakage current is seen in the motor winding, such that the phase current ripple is large, and the output ripple current generates the PWM frequency ripple and is output as the sum of the three-phase currents. In this case, it is possible to add the L or L/C filter, etc. to the output side of the neutral point lead unit (C1 in FIG. 6), thus reducing the output ripple current.

In addition, when the power controller 130 is operated by switching into the three-phase interleave (a phase difference of 120 degrees between the respective phases) PWM 720, the current of each phase is applied with the voltage of different phase. In particular, the current of each phase of the motor 140 is mutually influenced by the mutually linked magnetic flux like a coupled inductor having a leakage inductance. In particular, the ripple of the output current of the neutral point lead unit C1 of the motor 140 generates the ripple corresponding to three times the PWM frequency, and the magnitude of the ripple current is reduced in proportion to the PWM frequency.

Figure 8:
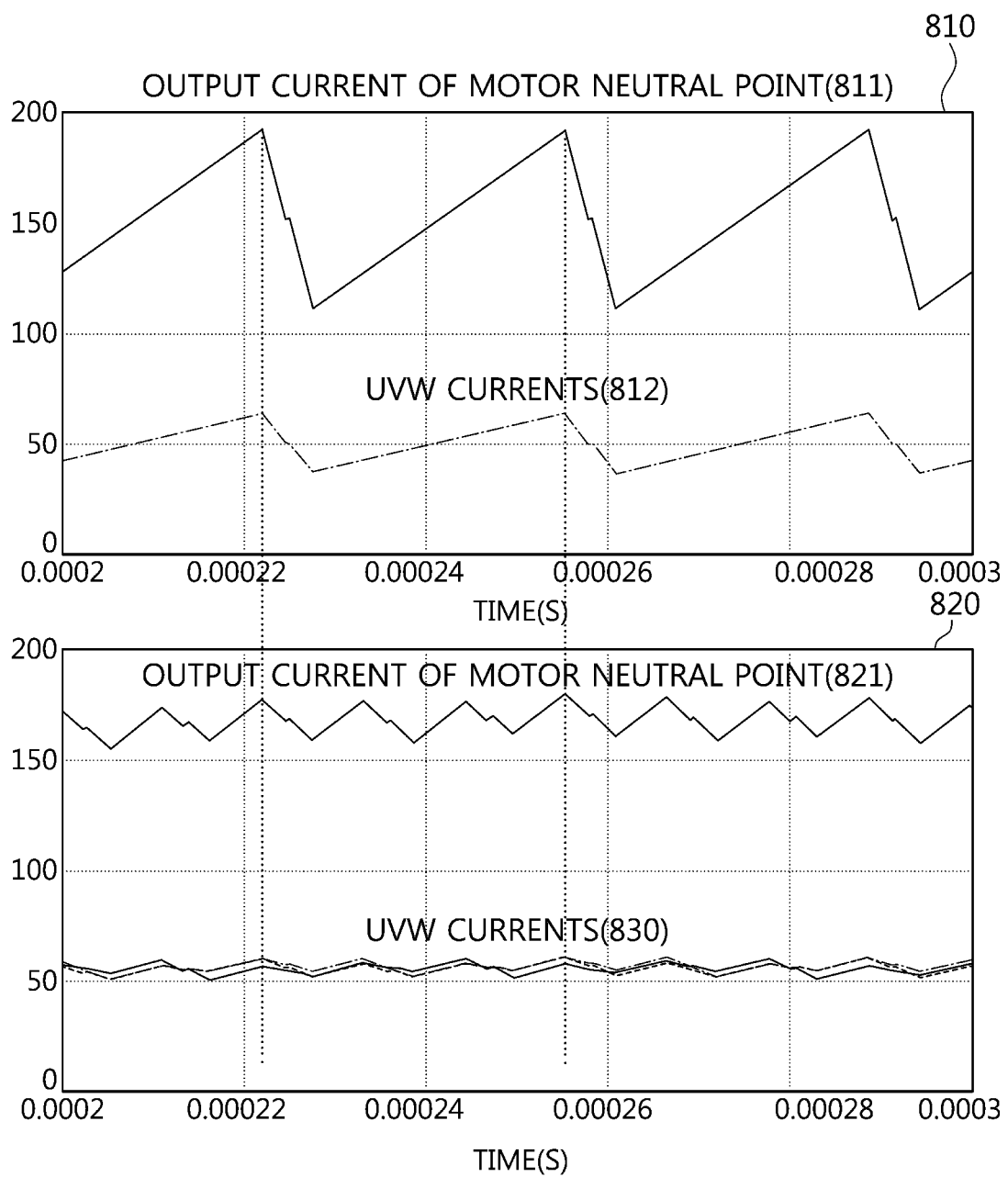
FIG. 8 is a graph illustrating the generation of a general ripple.

FIG. 8 is a graph illustrating a general ripple generation. Referring to FIG. 8, an upper graph 810 is a graph of the output current of the motor 140 when the power controller 130 is operated by switching into the in-phase PWM 710. A lower graph 820 is a graph of the output current of the motor 140 when the power controller 130 is operated by switching into the three-phase interleave PWM 720. UVW currents 812, 830 and motor neutral point output currents 811, 821 are fluctuated depending upon the in-phase PWM 710 and the three-phase interleave PWM 720.

Figure 9:
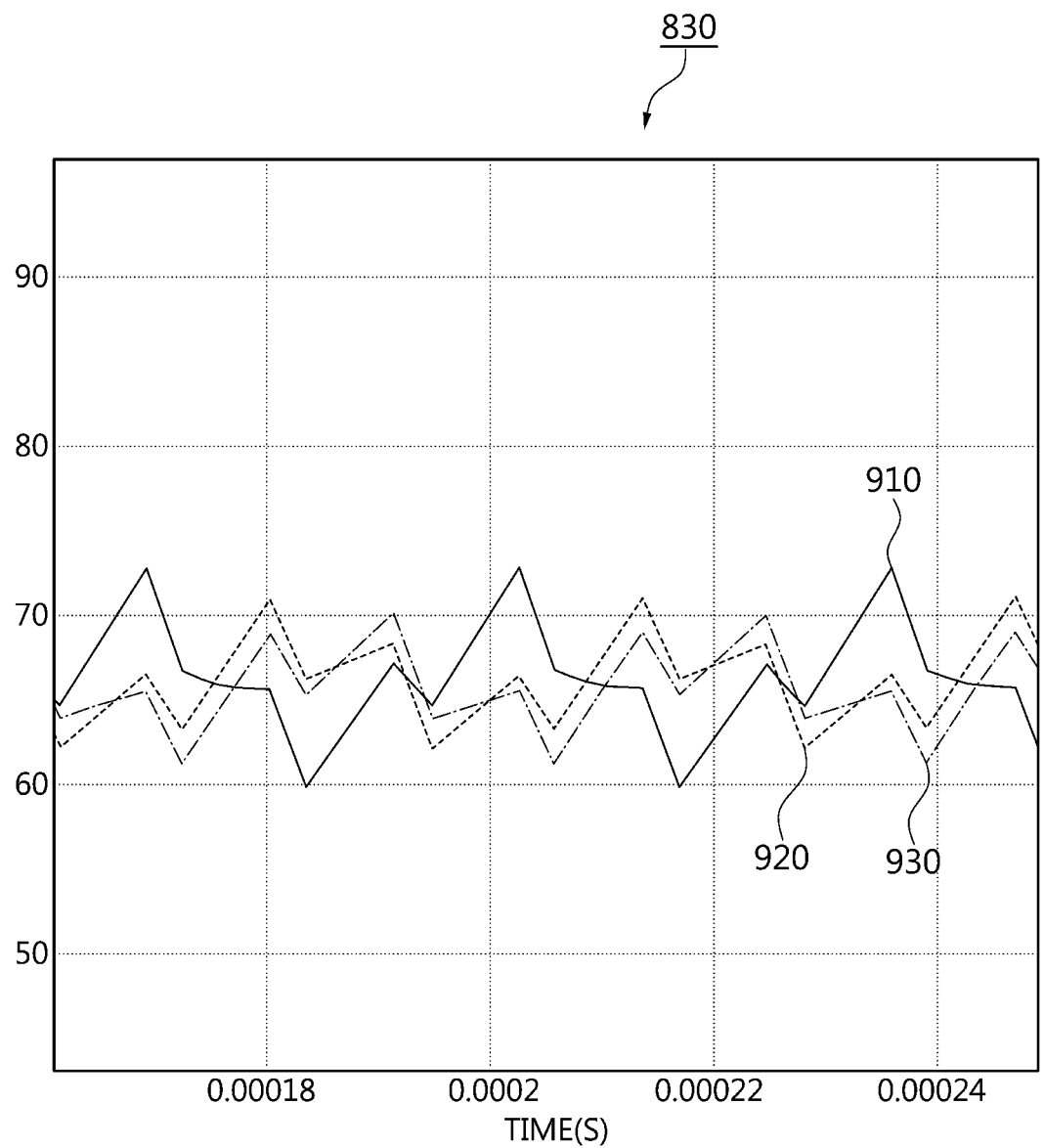
FIG. 9 is a graph illustrating by enlarging UVW currents illustrated in FIG. 8.

FIG. 9 is a graph illustrating by enlarging the UVW current 830 illustrated in FIG. 8. Particularly, FIG. 9 illustrates currents 910, 920, 930 of each phase when the motor 140 operates as a DC-DC converter (a three-phase interleave PWM having a phase difference of 120 degrees). The mutually linked magnetic flux affects other phases, resulting in change/bending corresponding to three times the PWM frequency. The size and shape of the current ripple of each phase are related to a PWM duty (an input/output voltage), leakage inductance of the motor, and the location of a rotor (when the inductance of each phase is different depending upon the location of the rotor).

In view of the current, an average current of each phase is equal, but it can be understood that the current of each phase is finely different upon switching. When the magnitude of the three-phase magnetic flux vector of the motor is changed by this current difference, a fine torque is generated. However, the generated average torque is zero, and only a fine ripple torque appears. That is, no rotational torque is generated when operating as a three-phase converter.

Figure 10:
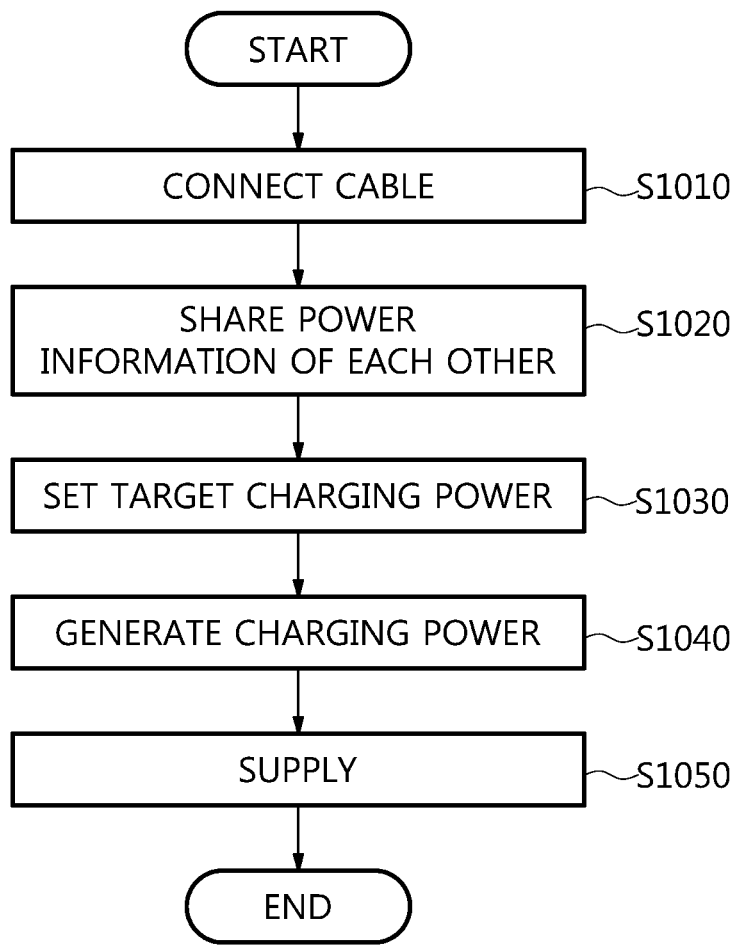
FIG. 10 is a flowchart illustrating the procedure of generating charging power in accordance with an embodiment of the present disclosure.

FIG. 10 is a flowchart illustrating the procedure of generating the charging power in accordance with an embodiment of the present disclosure. That is, FIG. 10 illustrates the procedure in which the emergency charging service vehicle 100 supplies the charging power to the discharging vehicle 10. Referring to FIG. 10, the emergency charging service vehicle 100 and the discharging vehicle 10 are connected by a high voltage quick charging cable to determine that there is no abnormality, and then share the power information of each other through the PLC communication (step S1010). Thereafter, in the emergency charging service vehicle 100, the charging controller 210 performs the EVSE mode of the quick charging process between the emergency charging service vehicle 100 and the discharging vehicle 10.

Then, after a target power is set, the motor 140/the power controller 130 are current-controlled by the three-phase step-down converter through the PWM to supply the energy in the order of the motor neutral point 601→the external cable 510→the discharging vehicle 10 (steps S1030, S1040, and S1050).

Figure 11:
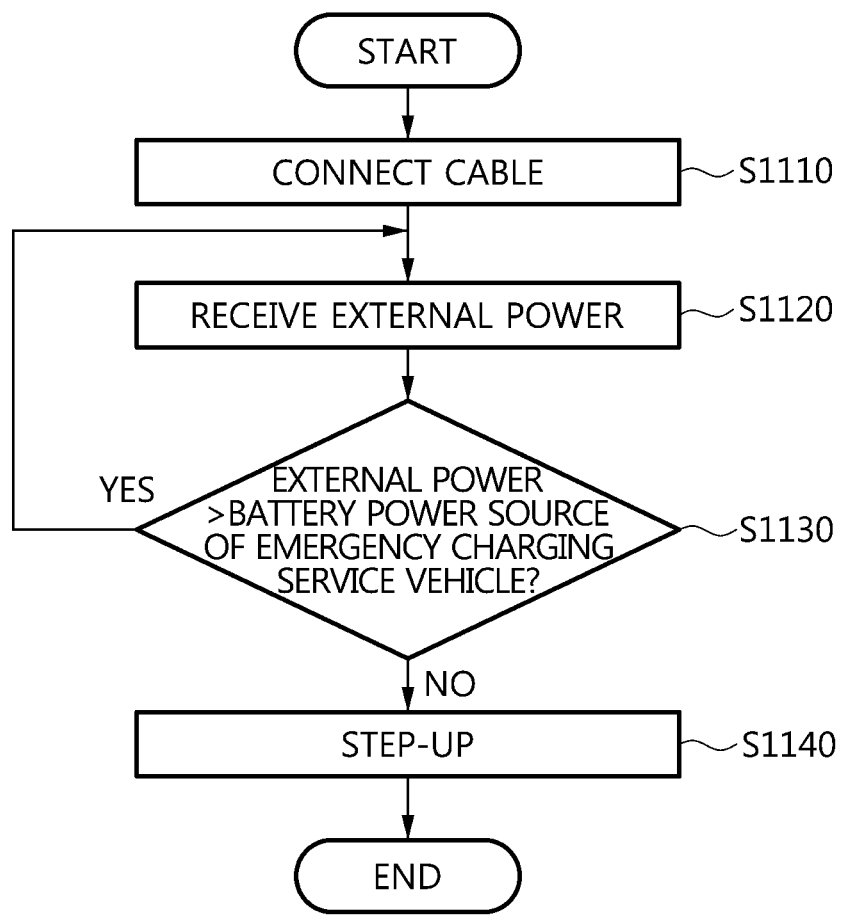
FIG. 11 is a flowchart illustrating the procedure of charging a battery in accordance with an embodiment of the present disclosure.

FIG. 11 is a flowchart illustrating a battery charging procedure in accordance with an embodiment of the present disclosure. That is, FIG. 11 illustrates the procedure in which the emergency charging service vehicle 100 receives the external power from the supply source (e.g., the EVSE, another electric vehicle). Referring to FIG. 11, the emergency charging service vehicle 100 and the external equipment are connected by the high voltage quick charging cable to receive the external power from the supply source (steps S1110 and S1120). That is, the external power is flowed in the order of the external cable 510→the neutral point lead unit C1→the switches R4, R6→the motor neutral point 601→the power controller 130→the battery 110. Alternatively, the energy (current) is flowed in the order of the external cable 510→the neutral point lead unit C1→the switches R4, R5→the battery 110.

The maximum external power of the supply source is compared with the battery power source of the emergency charging service vehicle 100 (step S1130). As a result of comparison, when the maximum external power is lower than the battery power source of the emergency charging service vehicle 100, the motor 140/the power controller 130 can be also operated as a step-up converter to charge the battery 100 (step S1140).

In addition, the steps of the method or the algorithm explained regarding the embodiments disclosed herein are implemented as a program command format that can be performed through various computers means to be recorded in a computer readable medium. The computer readable medium can include a program (command) code, a data file, a data structure, etc. separately or a combination thereof.

The program (command) code recorded in the medium can be the ones specially designed or configured for the present disclosure, or can be the one known and available to those skilled in the computer software. Examples of the computer readable medium can include a magnetic media such as a hard disk, a floppy disk, and a magnetic tape, an optical media such as a CD-ROM, a DVD, and a Blue ray, and a semiconductor storage device specially configured to store and perform a program (command) code such as a ROM, a RAM, and a flash memory.

Herein, examples of the program (command) code include a high-level language code that can be executed by a computer using an interpreter, etc., as well as a machine language code made such as those produced by a complier. The hardware device can be configured to operate as one or more software modules in order to perform the operation of the present disclosure, and vice versa.

What is claimed is:

1. A power conversion device for charging a battery of a vehicle, comprising:
   the battery;
   a motor for receiving a battery power source from the battery;
   a power controller for controlling the motor to change the battery power source into charging power; and
   a charging controller for selectively performing a charging power supply control for supplying the charging power to outside and a charging power receipt control for receiving external power,
   wherein the charging power receipt control and the charging power supply control are performed using the motor and the power controller.

2. The power conversion device of claim 1, wherein the motor has a neutral point lead unit configured such that a neutral point is led into the outside to be operable as a coupled inductor.

3. The power conversion device of claim 2, wherein the neutral point lead unit comprises a sensor for detecting the external power.

4. The power conversion device of claim 2, wherein the neutral point lead unit comprises a filter for filtering a ripple of the charging power.

5. The power conversion device of claim 1, comprising a connection inlet connector connected with the outside to deliver the charging power or a control signal.

6. The power conversion device of claim 5, wherein the connection inlet connector has a first terminal for receiving the external power, a second terminal for detecting whether or not the connection inlet connector has been connected with the outside, and a signal connection terminal for transmitting/receiving the control signal.

7. The power conversion device of claim 1, further comprising a display for displaying information on the charging power or the external power, wherein the charging power is set by a user input.

8. The power conversion device of claim 1, wherein the charging power is a voltage lower than the battery power source, and is adjusted by a Pulse Width Modulation (PWM) duty.

9. The power conversion device of claim 1, wherein the charging controller comprises a charging control unit for executing a charging power supply control, and a discharging control unit for executing a charging power receipt control.

10. A method for converting power for charging a battery of a vehicle, comprising:

performing, by a charging controller, a charging power supply control for supplying charging power to outside and a charging power receipt control for receiving external power;

receiving, by a motor, a battery power source from the battery; and controlling, by a power controller, the motor to change the battery power source into the charging power depending upon a control of the charging controller, wherein the charging power receipt control and the charging power supply control are performed using the motor and the power controller.

11. The method of claim 10, wherein the motor has a neutral point lead unit configured such that a neutral point is led into the outside to be operable as a coupled inductor.

12. The method of claim 11, wherein the neutral point lead unit comprises a sensor for detecting the external power.

13. The method of claim 11, wherein the neutral point lead unit comprises a filter for filtering a ripple of the charging power.

14. The method of claim 10, comprising a connection inlet connector connected with the outside to deliver the charging power or a control signal.

15. The method of claim 14, wherein the connection inlet connector has a first terminal for receiving the external power, a second terminal for detecting whether or not the connection inlet connector has been connected with the outside, and a signal connection terminal for transmitting/receiving the control signal.

16. The method of claim 10, wherein performing the charging power supply control further comprises displaying information on the charging power or the external power, and wherein the charging power is set by a user input.

17. The method of claim 10, wherein the charging power is a voltage lower than the battery power source, and is adjusted by a Pulse Width Modulation (PWM) duty.

18. The method of claim 10, wherein the charging controller comprises:

a charging control unit for executing the charging power supply control, and a discharging control unit for executing the charging power receipt control.

* * * * *